(12) United States Patent
Shibayama

(10) Patent No.: US 6,336,751 B1
(45) Date of Patent: Jan. 8, 2002

(54) FILM FEEDING DEVICE, AND OPTICAL APPARATUS INCLUDING THE SAME

(75) Inventor: Yoshinobu Shibayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/386,300

(22) Filed: Aug. 31, 1999

(30) Foreign Application Priority Data

Sep. 3, 1998 (JP) .......................................... 10-249627

(51) Int. Cl.$^7$ ................................................ G03B 1/00
(52) U.S. Cl. ...................................... 396/411; 396/418
(58) Field of Search ............................... 396/387, 411, 396/418, 396

(56) References Cited

U.S. PATENT DOCUMENTS 5,552,846 A * 9/1996 Tokui .......................... 396/418
5,568,214 A * 10/1996 Stiehler ........................ 396/411
6,170,999 B1 * 1/2001 Okuno ......................... 396/413

FOREIGN PATENT DOCUMENTS

| JP | 3-206435 | 9/1991 | ........... G03B/17/00 |
| JP | 4-225338 | 8/1992 | ........... G03B/17/00 |

* cited by examiner

Primary Examiner—Christopher E. Mahoney
(74) Attorney, Agent, or Firm—Fitzpatrick, Cella, Harper & Scinto

(57) ABSTRACT

A film feeding device includes a driving source, a spool gear, provided on a film wind-up spool, to which a driving force of the driving source is transmitted, a cartridge-spool driving gear for transmitting the driving force of the driving source to a cartridge spool within a film cartridge, a clutch gear, movable between a meshed position and an unmeshed position with respect to the spool gear, for transmitting a driving force of the spool gear to the cartridge-spool driving gear when meshed with the spool gear, and a moving mechanism for moving the clutch gear from the unmeshed position to the meshed position with respect to the spool gear by transmission driving by the driving source.

26 Claims, 5 Drawing Sheets

FILM FEEDING DEVICE, AND OPTICAL APPARATUS INCLUDING THE SAME

BACKGROUND OF THE INVENTION

1. Field of the Invention

The present invention relates to a film feeding device for winding and rewinding a photographing film. More particularly, the invention relates to a film feeding device which can perform film feeding driving from a film cartridge toward a winding spool.

2. Description of the Related Art

In some photographing films, a leading portion of the film is completely accommodated within a cartridge. When the cartridge accommodating such a film is loaded into a camera or the like, a spool within the cartridge (hereinafter termed a "cartridge spool") is driven by a film feeding mechanism provided within the camera or the like, in order to perform feeding driving (thrust driving) of the film from within the cartridge.

Together with such thrust driving, a spool for winding up the film (hereinafter termed a "wind-up spool") is simultaneously driven within the camera, so that the film is subjected to winding driving. After loading the film cartridge, thrust driving and winding driving of the film are performed to allow a photographing operation.

After completing all photographing operations, winding driving of the film into the cartridge (rewinding driving) is performed by inversely rotating the cartridge spool.

Mechanisms for performing the above-described film driving are proposed, for example, in Japanese Patent Laid-Open Application (Kokai) Nos. 3-206435 (1991) and 4-225338 (1992).

(1) For example, in the film feeding mechanism disclosed in Japanese Patent Laid-Open Application (Kokai) No. 3-206435 (1991), when simultaneously performing thrust driving of a film by driving of a cartridge spool and winding driving of the film by driving a wind-up spool using a one-way clutch, any difference between the thrust-driving speed and the winding-driving speed is cancelled.

(2) In the film feeding mechanism disclosed in Japanese Patent Laid-Open Application (Kokai) No. 4-225338 (1992), speed-difference cancellation means is provided in the proximity of the cartridge spool, in order to minimize the load given to a moter by a slip torque of the speed-difference cancellation means.

(3) The assignee of the prensent application has proposed a film feeding mechanism similar to that described in item (1), in which by incorporating a spool gear integrated with a wind-up spool in a gear train as an idler gear in thrust driving or rewinding driving, the spool gear, serving as means for inputting a driving force to the wind-up spool, also operates as means for transmitting power to the cartridge spool.

However, in the film feeding mechanisms described in items (1) and (2), a gear train for transmitting a driving force to the wind-up spool and a gear train for transmitting a driving force to the cartridge spool during winding driving of the film are disposed as different gear trains. As a result, there arise problems, such as the requirement of additional space for arranging the gear trains at both sides of the spool gear, an increase in the number of gears, and a decrease in the driving-force transmission efficiency.

In the film feeding mechanism described in item (3), the spool gear integrated with the wind-up spool is incorporated within the gear train for performing thrust driving and rewinding driving as an idler for the gear train. Hence, during rewinding driving of the film after completing photographing operations for all frames of the film, the wind-up spool performs feeding driving of the film in the direction of the cartridge. Accordingly, if the amount of feeding of the wind-up spool is larger than the amount of winding of the cartridge spool, the film is loosely wound within a spool chamber where the wind-up spool is accommodated, thereby preventing a smooth rewinding operation.

SUMMARY OF THE INVENTION

It is an object of the present invention to solve the above-described problems.

It is another object of the present invention to provide a film feeding device having a small size in which switching of a feeding direction can be reliably performed.

According to one aspect of the present invention, a film feeding device includes a driving source, a spool gear, provided on a film wind-up spool, to which a driving force of the driving source is transmitted, a cartridge-spool driving gear for transmitting the driving force of the driving source to a cartridge spool within a film cartridge, a clutch gear, movable between a meshed position and an unmeshed position with respect to the spool gear, for transmitting a driving force of the spool gear to the cartridge-spool driving gear when meshed with the spool gear, and a moving mechanism for moving the clutch gear from the unmeshed position to the meshed position with respect to the spool gear by transmission driving by the driving source.

According to another aspect of the present invention, a film feeding device includes a driving source, a spool gear provided on a film wind-up spool, a first clutch gear, movable between a meshed position and an unmeshed position with respect to the spool gear, for transmitting a driving force of the driving source to the spool gear when meshed with the spool gear, a cartridge-spool driving gear for transmitting the driving force of the driving source to a cartridge spool within a film cartridge, a second clutch gear, movable between a meshed position and an unmeshed position with respect to the spool gear, for transmitting a driving force of the spool gear to the cartridge-spool driving gear when meshed with the spool gear, and a moving mechanism for moving the second clutch gear from the unmeshed position to the meshed position with respect to the spool gear, linked with a movement of the first clutch gear from the meshed position to the unmeshed position with respect to the spool gear.

According to still another aspect of the present invention, a film feeding device includes a driving source, a spool gear provided on a film wind-up spool, a first clutch gear, movable between a meshed position and an unmeshed position with respect to the spool gear, for transmitting a driving force of the driving source to the spool gear when meshed with the spool gear, a cartridge-spool driving gear for transmitting the driving force of the driving source to a cartridge spool within a film cartridge, a second clutch gear, movable between a meshed position and an unmeshed position with respect to the spool gear, for transmitting a driving force of the spool gear to the cartridge-spool driving gear when meshed with the spool gear, and a moving mechanism for moving the second clutch gear from the unmeshed position to the meshed position with respect to the spool gear by transmission driving by the driving source, and for moving the second clutch gear from the unmeshed position to the meshed position with respect to the spool gear, linked with a movement of the first clutch gear from the meshed position to the unmeshed position with respect to the spool gear.

According to yet another aspect of the present invention, an optical apparatus includes a film feeding device. The film feeding device includes a driving source, a spool gear, provided on a film wind-up spool, to which a driving force of the driving source is transmitted, a cartridge-spool driving gear for transmitting the driving force of the driving source to a cartridge spool within a film cartridge, a clutch gear, movable between a meshed position and an unmeshed position with respect to the spool gear, for transmitting a driving force of the spool gear to the cartridge-spool driving gear when meshed with the spool gear, and a moving mechanism for moving the clutch gear from the unmeshed position to the meshed position with respect to the spool gear by transmission driving by the driving source.

According to yet a further aspect of the present invention, an optical apparatus includes a film feeding device. The film feeding device includes a driving source, a spool gear provided on a film wind-up spool, a first clutch gear, movable between a meshed position and an unmeshed position with respect to the spool gear, for transmitting a driving force of the driving source to the spool gear when meshed with the spool gear, a cartridge-spool driving gear for transmitting the driving force of the driving source to a cartridge spool within a film cartridge, a second clutch gear, movable between a meshed position and an unmeshed position with respect to the spool gear, for transmitting a driving force of the spool gear to the cartridge-spool driving gear when meshed with the spool gear, and a moving mechanism for moving the second clutch gear from the unmeshed position to the meshed position with respect to the spool gear, linked with a movement of the first clutch gear from the meshed position to the unmeshed position with respect to the spool gear.

According to yet another aspect of the present invention, an optical apparatus includes a film feeding device. The film feeding device includes a driving source, a spool gear provided on a film wind-up spool, a first clutch gear, movable between a meshed position and an unmeshed position with respect to the spool gear, for transmitting a driving force of the driving source to the spool gear when meshed with the spool gear, a cartridge-spool driving gear for transmitting the driving force of the driving source to a cartridge spool within a film cartridge, a second clutch gear, movable between a meshed position and an unmeshed position with respect to the spool gear, for transmitting a driving force of the spool gear to the cartridge-spool driving gear when meshed with the spool gear, and a moving mechanism for moving the second clutch gear from the unmeshed position to the meshed position with respect to the spool gear by transmission driving by the driving source, and for moving the second clutch gear from the unmeshed position to the meshed position with respect to the spool gear, linked with a movement of the first clutch gear from the meshed position to the unmeshed position with respect to the spool gear.

The foregoing and other objects, advantages and features of the present invention will become more apparent from the following description of the preferred embodiment taken in conjuction with the accompanying drawings.

DESCRIPTION OF THE PREFERRED EMBODIMENT

Figure 1:
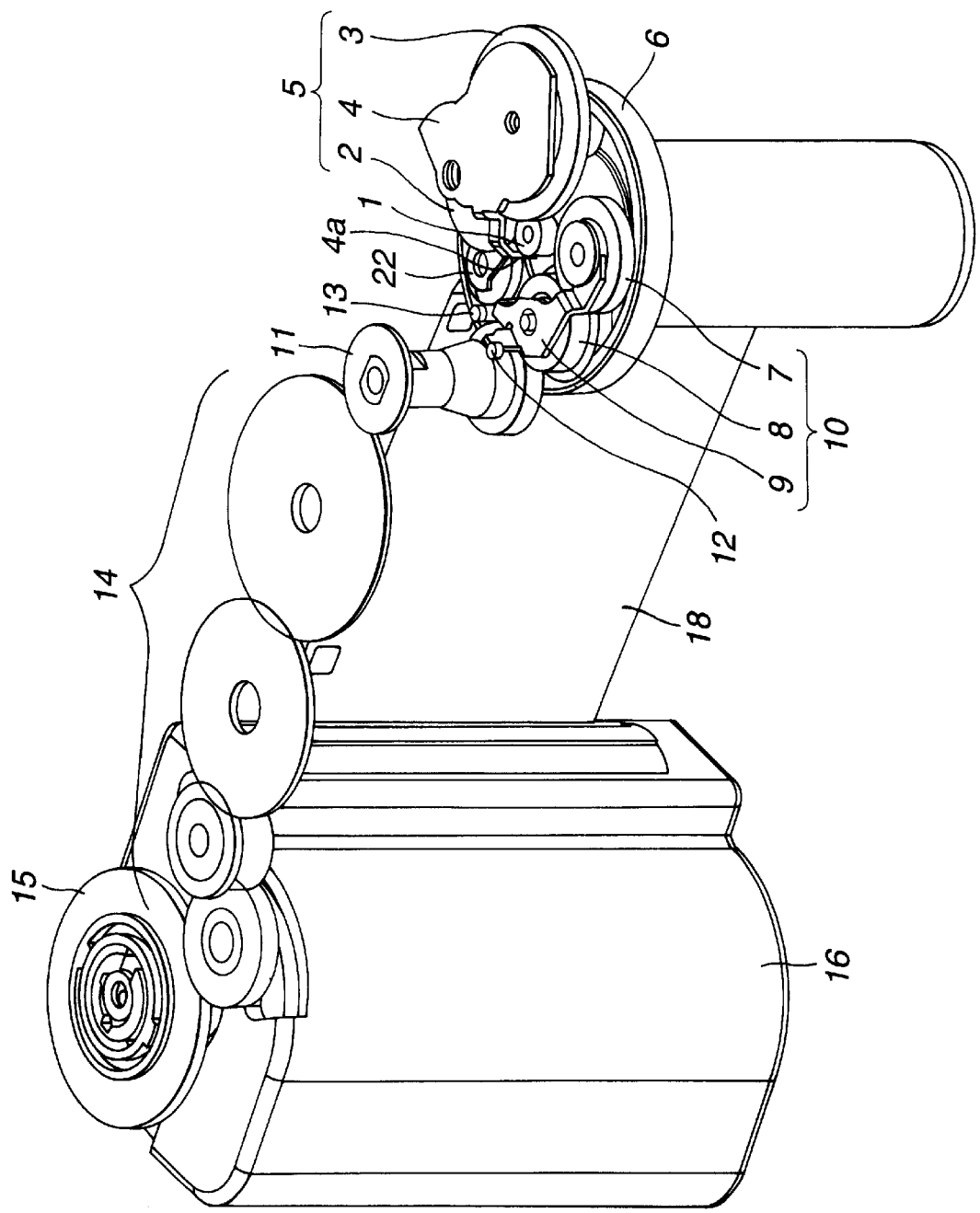
FIG. 1 is a perspective view illustrating the entire configuration of a film feeding device according to an embodiment of the present invention.
Figure 2:
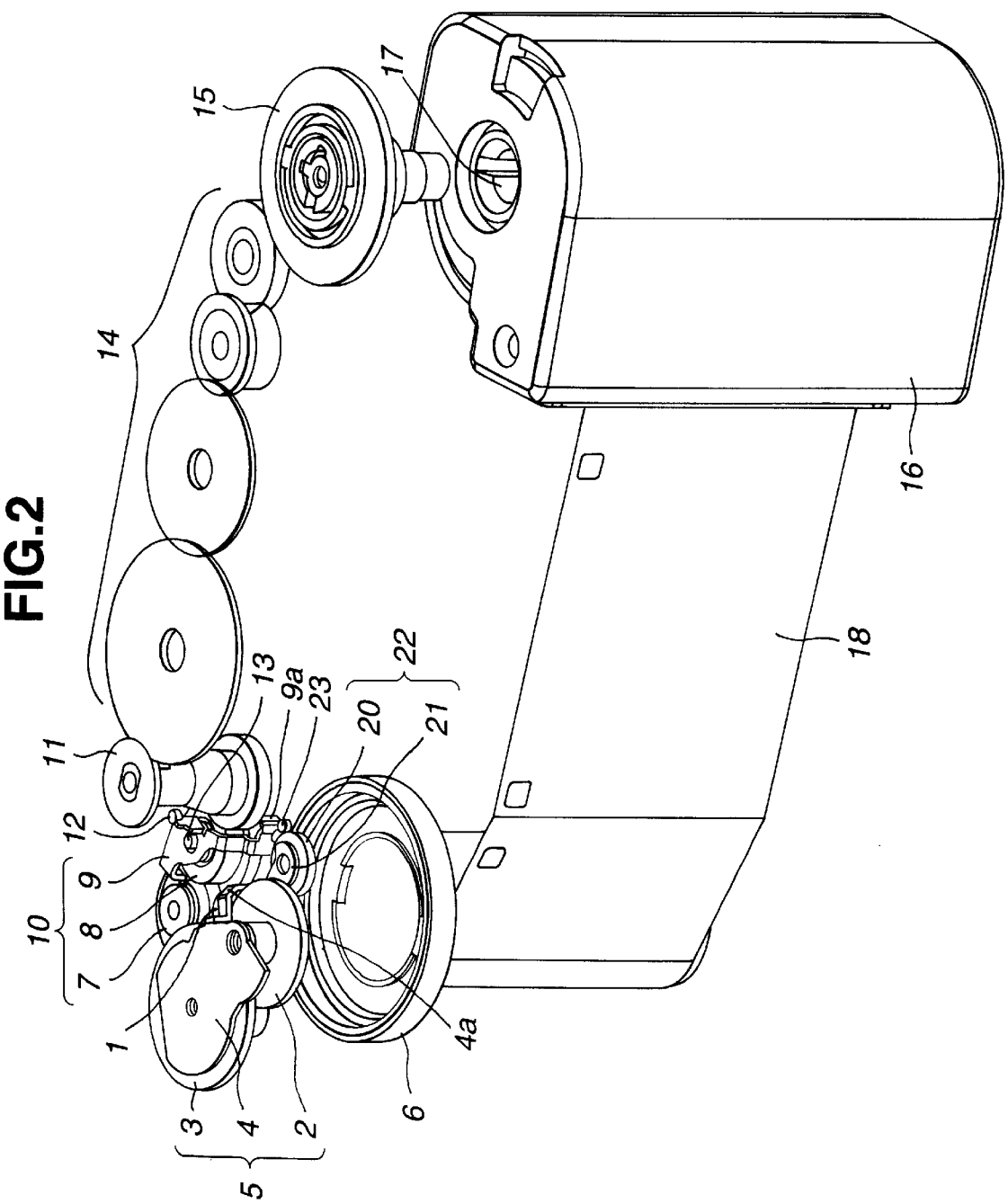
FIG. 2 is an exploded perspective view illustrating the entire configuration of the film feeding device shown in FIG. 1.
Figure 3:
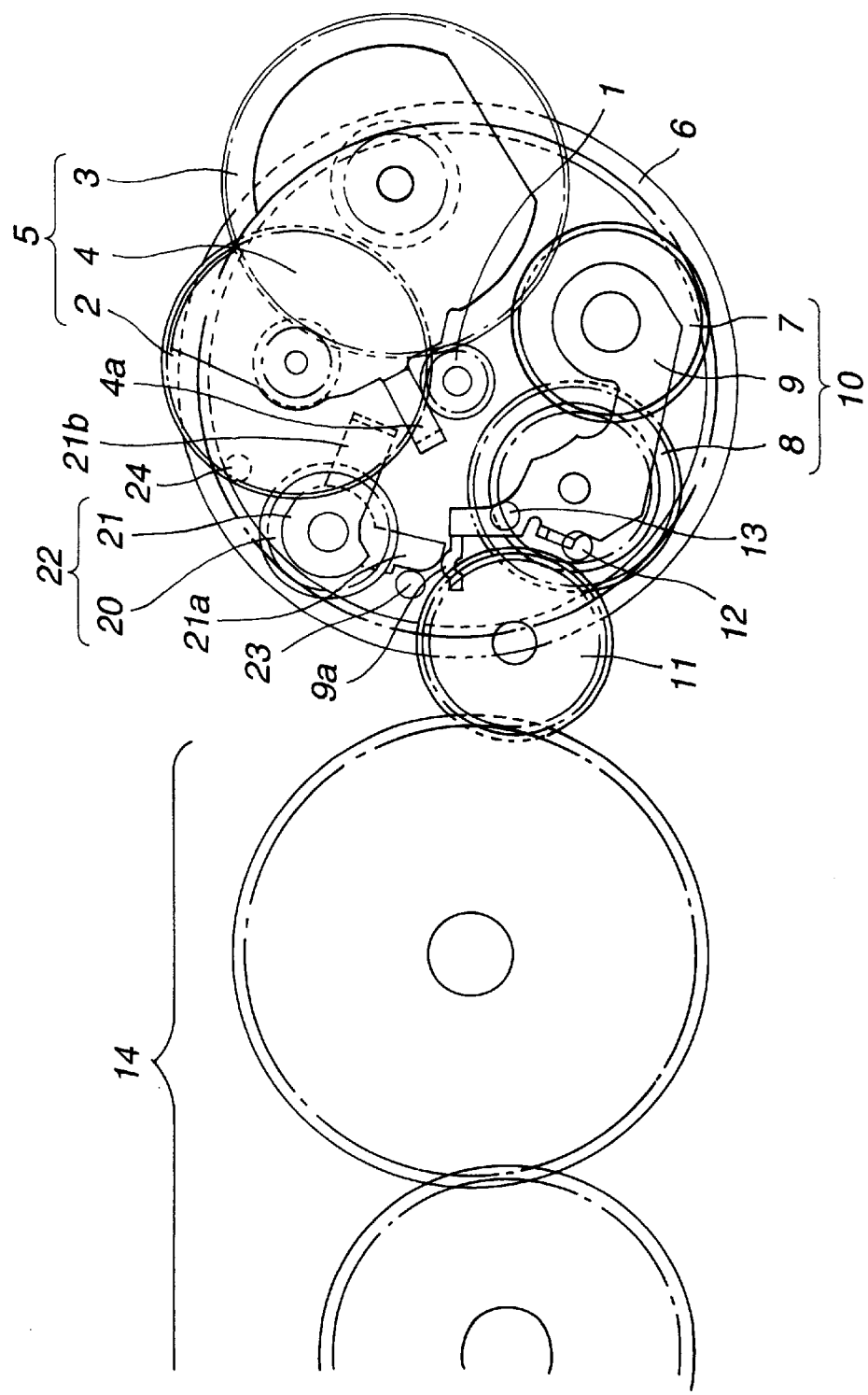
FIG. 3 is a plan view illustrating the arrangement of gears in a state of thrust winding driving for a film in the film feeding device shown in FIG. 1.
Figure 4:
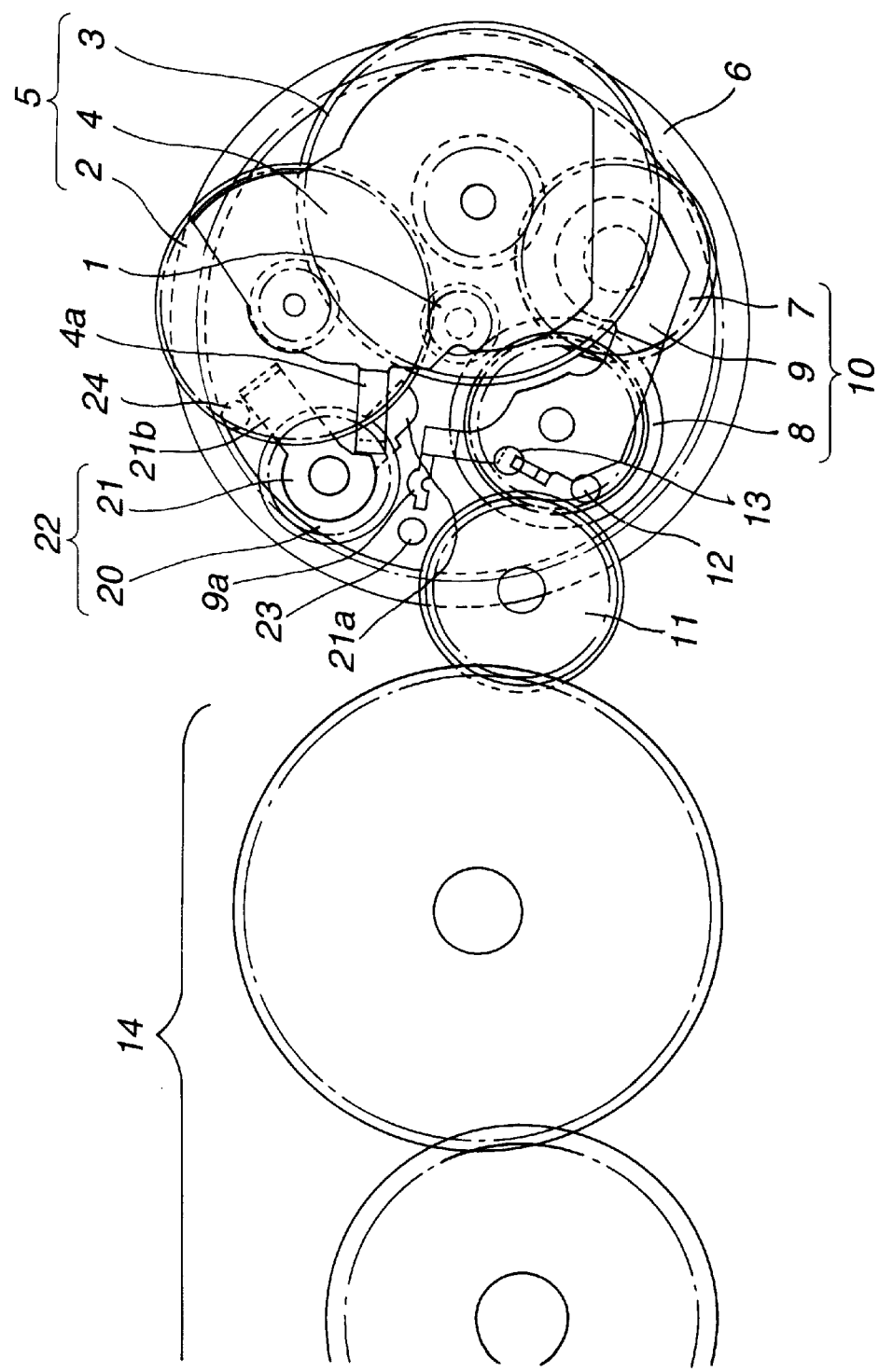
FIG. 4 is a plan view illustrating the arrangement of the gears in a state of rewinding driving for the film in the film feeding device shown in FIG. 1.

FIGS. 1 through 4 illustrate a film feeding device according to an embodiment of the present invention. FIG. 1 illustrates the entire configuration of the film feeding device. FIG. 2 illustrates a state in which the film feeding device is exploded for purposes of viewing. FIG. 3 illustrates the arrangement of a gear train in a windup driving state. FIG. 4 illustrates the arrangement of the gear train in a rewinding driving state. This film feeding device is incorporated in an optical apparatus, such as a camera, a film viewing apparatus or the like.

In FIGS. 1–4, a pinion gear 1 is directly connected to a feeding motor (not shown) accommodated within a wind-up spool. A winding sun gear 2 and a windup planetary gear 3 perform winding deceleration. A winding planetary lever 4 connects the winding sun gear 2 to the winding planetary gear 3. A spring member for generating a rotational load is incorporated between the winding planetary lever 4 and the winding sun gear 2 or the winding planetary gear 3. The winding sun gear 2 and the winding planetary gears 3 and lever 4 constitute a winding planetary gear unit 5.

By revolving in a counterclockwise direction around the winding sun gear 2, the winding planetary gear 3 meshes with a spool gear 6 integrally formed with a wind-up spool for winding up a film 18 and having an internal gear. By revolving in a clockwise direction, the winding planetary gear 3 leaves the spool gear 6, and meshes with a rewinding sun gear 7.

A rewinding planetary gear 8 revolves around the rewinding sun gear 7. A rewinding planetary lever 9 connects the rewinding planetary gear 8 to the rewinding sun gear 7 so as to be revolvable therearound. The rewinding sun gear 7, the rewinding planetary gear 8 and the rewinding planetary lever 9 constitute a rewinding planetary gear unit 10.

By revolving in a counterclockwise direction around the rewinding sun gear 7, the rewinding planetary gear 8 meshes with the spool gear 6. By revolving in a clockwise direction, the rewinding planetary gear 8 leaves the spool gear 6.

The rewinding planetary gear 8 comprises two gears separated in the vertical direction. After the film 18 subjected to thrust driving has been wound around the wind-up spool, the upper and lower gear integrally rotate while the amount of winding of the film 18 by the winding spool is smaller than the amount of feeding of the film 18 from the cartridge by thrust driving. The film 18 is thereby subjected to winding driving and thrust driving, and is wound around the winding spool. When the amount of winding of the film 18 by the wind-up spool becomes larger than the amount of feeding of the film 18, the upper gear rotates at a speed higher than the lower gear to provide a slip between the upper and lower gears, so that film winding by the winding spool is continued while cancelling the revolution-speed difference between the upper and lower gears.

A rewinding thrust gear 11 is disposed in a state in which its rotation is regulated by stoppers 12 and 13 so that it always meshes with the upper gear irrespective of the direction of revolution of the rewinding planetary gear 8.

The gear trains configured in the above-described manner are disposed at upper portions in the wind-up spool within an optical apparatus (not shown), such as a camera or the like, and transmits the driving force to the cartridge spool via an idler gear train 14 which is always engaged with an upper gear of the rewinding thrust gear 11.

A fork gear 15 always meshes with a gear provided at the end of the idler gear train 14. The fork gear 15 has a key for rotating a cartridge spool 17 by being engaged with a key groove in the cartridge spool 17.

Figure 5:
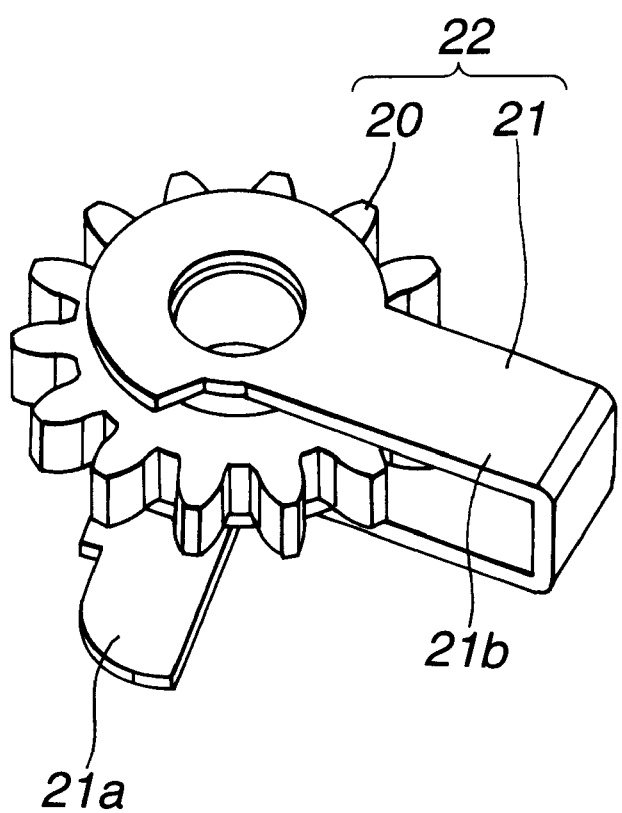
FIG. 5 is a perspective view illustrating a switching lever unit used in the film feeding device shown in FIG. 1.

A switching gear 20 always meshes with the spool gear 6. As shown in FIG. 5, a switching lever 21 having a substantially U-shaped cross section is mounted on the switching gear 20 so as to grasp it in the vertical direction with an elastic force. As a result, a predetermined frictional force is generated between the switching gear 20 and the switching lever 21. The switching gear 20 and the switching lever 21 constitute a switching lever unit 22.

Next, the operation of the film feeding device having the above-described configuration will be described. A description will be provided of the operation when performing film winding after loading a film cartridge 16 in an optical apparatus, with reference to FIG. 3.

When the cartridge 16 has been loaded within the apparatus, and a cartridge-loading completion signal or a use of-cartridge enable signal is generated by detection means (not shown), a feeding motor. is turned on to rotate the pinion gear 1 in a clockwise direction. The winding sun gear 2 is thereby rotated in a counterclockwise direction from the state shown in FIG. 4, the winding planetary gear 3 revolves in a counterclockwise direction around the sun gear 2 together with the winding planetary lever 4, and the winding planetary gear 3 meshes with the inner gear of the spool gear 6. The revolution of the winding planetary gear 3 in a clockwise direction is transmitted to the spool gear 6, which is rotated in a clockwise direction.

When the spool gear 6 has starated to rotate, the switching gear 20 meshing with the spool gear 6 starts to rotate in a clockwise direction from the state shown in FIG. 4, and the switching lever 21 having the frictional force with the switching gear 20 also rotates in a clockwise direction. As a result, a distal end portion 21a of the switching lever 21 pushes a bent side portion 9a of the rewinding planetary lever 9, to cause the rewinding planetary lever 9 to rotate around the rewinding sun gear 7 in a counterclockwise direction, and to cause the lower gear of the rewinding planetary gear 8 revolving in a clockwise direction to mesh with the spool gear 6. Then, the switching lever 21 contacts a stopper 23, so that further rotation of the switching-lever 21 in a clockwise direction is regulated.

At that time, since the switching gear 20 and the switching lever 21 are integrated with a predetermined frictional force, and the driving force to rotate the switching gear 20 transmitted by the spool gear 6 is set to be larger than the frictional force, the switching lever 21 stops, so that the switching gear 20 slips.

Since the spool gear 6 rotates in a clockwise direction, a revolving force in a clockwise direction so as to cause the lower gear of the rewinding planetary gear 8 to leave the spool gear 6 is generated in the rewinding planetary gear unit 10. However, since the distal end portion 21a of the switching lever 21 is in a state of stopping by contacting the stopper 23, revolution of the rewinding planetary gear unit 10 is regulated by the switching lever 21, and the driving force is transmitted from the spool gear 6 to the rewinding planetary gear 8.

This driving force is transmitted from the rewinding planetary gear 8 to the rewinding thrust gear 11, the idler gear 14 and the fork gear 15, to rotate the catridge spool 17 and cause feeding driving (thrust driving) of the film 18 from the cartridge 16.

The film 18 fed from the cartridge 16 is wound around the winding spool after passing through an aperture portion of the optical apparatus. At that time, since the rotation driving of the wind-up spool has been started before starting thrust driving of the film 18 as described above, the winding of the leading portion of the film 18 around the wind-up spool is reliably and smoothly performed.

After the film 18 has been wound around the wind-up spool, both thrust driving of the film 18, and winding (winding driving) of the film 18 by the wind-up spool are performed. The rotation speeds of the respective spools are set so that the amount of feeding of the film 18 substantially equals the amount of winding of the film 18 immediately after the film 18 has been wound around the wind-up spool.

When the winding diameter of the winding spool increases and the amount of winding of the film 18 becomes larger than the amount of feeding of the film 18 as photographing operations for the film 18 proceed, the cartridge spool 17 is subjected to rotation driving by the film 18 at a speed higher than the rotation speed due to the driving force from the feeding motor. As a result, the fork gear 15, the idler gear 14 and the rewinding thrust gear 13 are also subjected to rotation driving by the film 18. However, since the rotation-speed difference is cancelled by the slipping mechanism of the upper and lower gears of the rewinding planetary gear 8, problems, such as stretching of the film 18, and the like, do not arise.

Next, a decription will be provided of the operation when rewinding the film 18 into the cartridge 16 by automatic rewinding after all exposable frames have been exposed, or by rewinding in accordance with a manual operation after exposing an arbitrary number of frames.

When a signal indicating starting of a rewinding operation is input according to an automatic or manual operation, the feeding motor is turned on, to rotate the pinion gear 1 in a counterclockwise direction which is opposite to the direction during a winding operation. The winding sun gear 2 is thereby subjected to rotation driving in a clockwise direction from the state shown in FIG. 3, the winding planetary gear 3 revolves in a clockwise direction around the winding sun gear 2 together with the winding planetary lever 4, and the winding planetary gear 3 leaves the inner gear of the spool gear 6 and meshes with the rewinding sun gear 7.

While the winding planetary gear 4 revolves in a clockwise direction, an arm portion 4a of the winding planetary lever 4 pushes a body portion 21b of the switching lever 21, to rotate the switching lever 21 in a counterclockwise direction. The distal end portion 21a of the switching lever 21 thereby leaves the bent side portion 9a of the rewinding planetary lever 9. Then, the rewinding sun gear 7 is subjected to rotation driving in a clockwise direction by the winding planetary gear 3. As a result, the rewinding planetary gear 8 revolves around the sun gear 7 in a clockwise direction together with the winding planetary lever 9 from the state shown in FIG. 3, and the lower gear of the rewinding planetary gear 8 leaves the spool gear 6. Thus, the spool gear 6 becomes free, and the driving force of the feeding motor is transmitted to the rewinding thrust gear 11, the idler gear 14 and the fork gear 15 via the winding planetary gear unit 5 and the rewinding planetary gear unit 10, to cause the cartridge spool 17 to rotate in a direction opposite to the direction during thrust driving, thereby to cause rewinding driving of the film 18 into the cartridge 16.

There is the possibility that during the revolution of the winding planetary gear unit 5 in a clockwise direction, the arm portion 4*a* of the winding planetary lever 4 pushes the body portion 21*b* of the switching lever 21, to rotate the switching lever 21 in a counterclockwise direction, and when the distal end portion 21*a* of the switching lever 21 leaves the rewinding planetary gear unit 10, the spool gear 6 in a free state is momentarily rotated. However, since the spool gear 6 is rotated only a small amount at that instant, problems, such as loosening of the film 18 wound around the wind-up spool, and the like, will not arise.

By the rotation of the spool gear 6 in a counterclockwise direction as a result of winding of the film 18 by the cartridge spool 17, the switching gear 20 also rotates in a counterclockwise direction, and the switching lever 21 rotates to a position separated from the arm portion 4*a* of the winding planetary lever 4 and stops by contacting the stopper 24.

The individual components shown in outline in the drawings are all well known in the film feeding device arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A film feeding device comprising:
    a driving source;
    a spool gear, provided on a film wind-up spool, and to which a driving force of said driving source is transmitted;
    a cartridge-spool driving gear for transmitting the driving force of said driving source to a cartridge spool within a film cartridge;
    a clutch gear, movable between a meshed position and an unmeshed position with respect to said spool gear, for transmitting a driving force of said spool gear to said cartridge-spool driving gear when meshed with said spool gear; and
    a moving mechanism for moving said clutch gear from the unmeshed position to the meshed position with respect to said spool gear by transmission driving by said driving source,
    said moving mechanism comprising a lever gear which meshes with said spool gear, said lever gear including a lever that moves said clutch gear from the unmeshed position to the meshed position with respect to said spool gear by rotation of said spool gear in a predetermined direction.

2. A film feeding device according to claim 1, wherein said clutch gear comprises a planetary gear revolving between the meshed position and the unmeshed position with respect to said spool gear.

3. A film feeding device according to claim 2, wherein said clutch gear is connected to a sun gear via a planetary lever.

4. A film feeding device according to claim 3, wherein said moving mechanism comprises a gear meshed with said spool gear, and a contact portion rotating integrally with said gear.

5. A film feeding device according to claim 4, wherein, when said spool gear is driven by said driving source, said contact portion pushes said planetary lever in order to move said clutch gear from the unmeshed position to the meshed position with respect to said spool gear.

6. A film feeding device according to claim 1, wherein said spool gear comprises an internal gear integrally formed with the film wind-up spool.

7. A film feeding device comprising:
    a driving source;
    a spool gear provided on a film wind-up spool;
    a first clutch gear, movable between a meshed position and an unmeshed position with respect to said spool gear, for transmitting a driving force of said driving source to said spool gear when meshed with said spool gear;
    a cartridge-spool driving gear for transmitting the driving force of said driving source to a cartridge spool within a film cartridge;
    a second clutch gear, movable between a meshed position and an unmeshed position with respect said spool gear, for transmitting a driving force of said spool gear to said cartridge-spool driving gear when meshed with said spool gear; and
    a moving mechanism for moving said second clutch gear from the unmeshed position to the meshed position with respect to said spool gear by transmission driving by said driving source, and for moving said second clutch gear from the meshed position to the unmeshed position with respect to said spool gear, linked with a movement of said first clutch gear from the meshed position to the unmeshed position with respect to said spool gear,
    said moving mechanism comprising a lever gear which meshes with said spool gear, said lever gear including a lever that moves said second clutch gear from the unmeshed position to the meshed position with respect to said spool gear by rotation of said spool gear in a predetermined direction.

8. A film feeding device according to claim 7, wherein each of said first clutch gear and said second clutch gear comprises a planetary gear revolving between the meshed position and the unmeshed position with respect to said spool gear.

9. A film feeding device according to claim 8, wherein said first clutch gear is connected to a first sun gear via a first planetary lever, and said second clutch gear is connected to a second sun gear via a second planetary lever.

10. A film feeding device according to claim 9, wherein said moving mechanism comprises a gear meshed with said spool gear, a first contact portion contacting said first planetary lever, and a second contact portion contacting said second planetary lever.

11. A film feeding device according to claim 10, wherein, when said first clutch gear moves from the meshed position to the unmeshed position with respect to said spool gear, said first planetary lever pushes said first contact portion in order to move said second clutch gear from the meshed position to the unmeshed position with respect to said spool gear.

12. A film feeding device according to claim 10, wherein, when said spool gear is driven by said driving source, said second contact portion pushes said second planetary lever in order to move said second clutch gear from the unmeshed position to the meshed position with respect to said spool gear.

13. A film feeding device according to claim 7, wherein said spool gear comprises an internal gear integrally formed with the film wind-up spool.

14. An optical apparatus including a film feeding device, said film feeding device comprising:
- a driving source;
- a spool gear, provided on a film winding spool, and to which a driving force of said driving source is transmitted;
- a cartridge-spool driving gear for transmitting the driving force of said driving source to a cartridge spool within a film cartridge;
- a clutch gear, movable between a meshed position and an unmeshed position with respect to said spool gear, for transmitting a driving force of said spool gear to said cartridge-spool driving gear when meshed with said spool gear; and
- a moving mechanism for moving said clutch gear from the unmeshed position to the meshed position with respect to said spool gear by transmission driving by said driving source,
- said moving mechanism comprising a lever gear which meshes with said spool gear, said lever gear including a lever that moves said clutch gear from the unmeshed position to the meshed position with respect to said spool gear by rotation of said spool gear in a predetermined direction.

15. An optical apparatus according to claim 14, wherein said clutch gear comprises a planetary gear revolving between the meshed position and the unmeshed position with respect to said spool gear.

16. An optical apparatus according to claim 15, wherein said clutch gear is connected to a sun gear via a planetary lever.

17. An optical apparatus according to claim 16, wherein said moving mechanism comprises a gear meshed with said spool gear, and a contact portion rotating integrally with said gear.

18. An optical apparatus according to claim 17, wherein, when said spool gear is driven by said driving source, said contact portion pushes said planetary lever in order to move said clutch gear from the unmeshed position to the meshed position with respect to said spool gear.

19. An optical apparatus according to claim 14, wherein said spool gear comprises an internal gear integrally formed with the film wind-up spool.

20. An optical apparatus including a film feeding device, said film feeding device comprising:
- a driving source;
- a spool gear provided on a film wind-up spool;
- a first clutch gear, movable between a meshed position and an unmeshed position with respect to said spool gear, for transmitting a driving force of said driving source to said spool gear when meshed with said spool gear;
- a cartridge-spool driving gear for transmitting the driving force of said driving source to a cartridge spool within a film cartridge;
- a second clutch gear, movable between a meshed position and an unmeshed position with respect to said spool gear, for transmitting a driving force of said spool gear to said cartridge-spool driving gear when meshed with said spool gear; and
- a moving mechanism for moving said second clutch gear from the unmeshed position to the meshed position with respect to said spool gear by transmission driving by said driving source, and for moving said second clutch gear from the meshed position to the unmeshed position with respect to said spool gear, linked with a movement of said first clutch gear from the meshed position to the ummeshed position with respect to said spool gear,
- said moving mechanism comprising a lever gear which meshes with said spool gear, said lever gear including a lever that moves said second clutch gear from the unmeshed position to the meshed position with respect to said spool gear by rotation of said spool gear in a predetermined direction.

21. An optical apparatus according to claim 20, wherein each of said first clutch gear and said second clutch gear comprises a planetary gear revolving between the meshed position and the unmeshed position with respect to said spool gear.

22. An optical apparatus according to claim 21, wherein said first clutch gear is connected to a first sun gear via a first planetary lever, and said second clutch gear is connected to a second sun gear via a second planetary lever.

23. An optical apparatus according to claim 22, wherein said moving mechanism comprises a gear meshed with said spool gear, a first contact portion contacting said first planetary lever, and a second contact portion contacting said second planetary lever.

24. An optical apparatus according to claim 23, wherein, when said first clutch gear moves from the meshed position to the unmeshed position with respect to said spool gear, said first planetary lever pushes said first contact portion in order to move said second clutch gear from the meshed position to the unmeshed position with respect to said spool gear.

25. An optical apparatus according to claim 23, wherein, when said spool gear is driven by said driving source, said second contact portion pushes said second planetary lever in order to move said second clutch gear from the unmeshed position to the meshed position with respect to said spool gear.

26. An optical apparatus according to claim 20, wherein said spool gear comprises an internal gear integrally formed with the film wind-up spool.

* * * * *

UNITED STATES PATENT AND TRADEMARK OFFICE
CERTIFICATE OF CORRECTION

PATENT NO. : 6,336,751 B1
DATED : January 8, 2002
INVENTOR(S) : Yoshinobu Shibayama It is certified that error appears in the above-identified patent and that said Letters Patent is hereby corrected as shown below:

Column 1,
Line 49, "prensent" should read -- present --.

Column 4,
Line 27, "windup" should read -- winding --.
Line 57, "winding" ($2^{nd}$ occurrence) should read -- wind-up --.
Line 61, "winding" ($1^{st}$ occurrence) should read -- wind-up --.
Line 65, "winding" ($2^{nd}$ occurrence) should read -- wind-up --.

Column 5,
Line 31, "motor." should read -- motor --.

Column 6,
Line 11, "winding" should read -- wind-up --.

Column 8,
Line 28, "respect said" should read -- respect to said --.

Signed and Sealed this

Twenty-seventh Day of August, 2002

Attest:

JAMES E. ROGAN
Attesting Officer      Director of the United States Patent and Trademark Office